(12) United States Patent  
Kuhne

(10) Patent No.: US 9,046,943 B1  
(45) Date of Patent: Jun. 2, 2015

(54) VIRTUAL CONTROL FOR TOUCH-SENSITIVE DEVICES

(71) Applicant: Google Inc., Mountain View, CA (US)

(72) Inventor: Stefan Kuhne, San Jose, CA (US)

(73) Assignee: Google Inc., Mountain View, CA (US)

( * ) Notice: Subject to any disclaimer, the term of this patent is extended or adjusted under 35 U.S.C. 154(b) by 166 days.

(21) Appl. No.: 13/662,334

(22) Filed: Oct. 26, 2012

(51) Int. Cl.  
    *G06F 3/041* (2006.01)  
    *G06F 3/048* (2013.01)

(52) U.S. Cl.  
    CPC ............... *G06F 3/041* (2013.01); *G06F 3/048* (2013.01)

(58) Field of Classification Search  
    CPC ........................................ G06F 3/048–3/04897  
    See application file for complete search history.

(56) References Cited

U.S. PATENT DOCUMENTS

| | | | | |
|---|---|---|---|---|
| 2004/0056839 | A1* | 3/2004 | Yoshihara | 345/156 |
| 2006/0197753 | A1* | 9/2006 | Hotelling | 345/173 |
| 2011/0157046 | A1* | 6/2011 | Lee et al. | 345/173 |
| 2013/0069991 | A1* | 3/2013 | Davidson | 345/663 |

* cited by examiner

*Primary Examiner* — Yong H Sim  
(74) *Attorney, Agent, or Firm* — McDermott Will & Emery LLP

(57) ABSTRACT

A virtual control is displayed on a touch-responsive display screen. The virtual control visually is displayed as multiple control segments, and layered over an active graphical user interface (GUI). When a contact and subsequent movement is detected on the surface of the display screen at a selected control segment, the selected control segment visually detaches and moves in the direction of the movement. Simultaneously, the GUI is instructed to cycle through a plurality of available program options based on a current position of the selected control segment on the display screen. When the contact is released, the GUI is set to a selected option corresponding to the current position of the selected control segment.

20 Claims, 5 Drawing Sheets

VIRTUAL CONTROL FOR TOUCH-SENSITIVE DEVICES

BACKGROUND

A graphical user interface (GUI) may include various integrated virtual controls for entering information or data based on a fixed scale (for example, 0 ... 1), or for linearly controlling a certain feature of a device (for example, a volume control). Virtual controls used in connection with a touch screen allow a user to easily manipulate parameters of a GUI, or, in some instances, to easily reposition portions of the GUI about the display.

SUMMARY

The subject technology provides a system and method for displaying a virtual control. According to one aspect, a computer-implemented method may comprise displaying a stand-alone virtual control on a touch-sensitive display screen of a computing device, the virtual control layered over at least a portion of a graphic user interface (GUI) at a starting position and comprising one or more virtually-detachable control segments, detecting a contact and subsequent movement of the contact over a surface of the display screen, the contact originating at a selected control segment and moving away from the starting position, visually moving, in response to the movement of the contact, the selected control segment in a direction of the movement, and cycling, in response to the movement of the contact, through a plurality of available program options associated with the GUI based on a current position of the selected control segment on the display screen. Other aspects include corresponding systems, apparatus, and computer program products.

The previously described aspects and other aspects may include one or more of the following features. For example, the method may further comprise receiving an indication that the movement has stopped at a stopping position, and selecting a selected one or the plurality of program options corresponding to the stopping position. The virtual control may be displayed as a circle, the virtually-detachable control segments being positioned about a common center point. The virtual control may comprise multiple virtually-detachable control segments, each virtually-detachable control segment operating to, when moved, cycle a unique set of program options.

The method may further comprise, in response to detecting the contact, visually detaching the selected control segment from remaining portions of the virtual control. The virtual control may comprise multiple interactive segments, each interactive segment, when activated by a contact or movement at a location of the display screen corresponding to the interactive segment, operating to control a different technical function of the GUI. Cycling through the plurality of program options may comprise cycling through a plurality of browser tabs displayed in a web browser. A new tab may be opened for each predetermined number of pixels the selected control segment is moved. The method may further comprise detecting a movement of the contact toward the starting position, visually moving the selected control segment toward the starting position, and cycling through the plurality of program options, in a reverse order.

Additionally or in the alternative, the method may further comprise detecting, before displaying the virtual control, multiple simultaneous contacts points at the surface of the display screen, wherein the virtual control is displayed on the display screen at a location corresponding to the multiple simultaneous contact points. In this regard, a size of the virtual control may correspond to a distance between an opposing two of the multiple simultaneous contact points. The virtual control may be displayed when the multiple simultaneous contact points are detected and maintained at the surface of the display screen for a predetermined period of time.

In another aspect, a machine-readable medium may have instructions stored thereon that, when executed, cause a machine to perform a method for displaying a virtual control. In this regard, the method may comprise providing a virtual control for display on a touch-sensitive display screen of a computing device, the virtual control visually displayed as multiple control segments, the virtual control being displayed layered over an active graphical user interface (GUI) displayed on the display screen, receiving an indication of contact with the display screen at a location corresponding to a selected control segment, and activating, in response to the contact, control instructions corresponding to the selected control segment, wherein the control instructions, when activated, operate to control a technical function of the GUI based on a movement of the contact over the display screen. Other aspects include corresponding systems, apparatus, and computer program products.

The previously described aspects and other aspects may include one or more of the following features. For example, the method may further comprise receiving an indication that the contact is moving in a first direction, and visually moving the selected control segment away from the virtual control, in the first direction while cycling though a plurality of program conditions related to the technical function of the GUI in a first order. A program condition may be cycled for each movement of the selected control segment a predetermined number of pixels.

Additionally or in the alternative, the method may further comprise receiving an indication that the contact is moving in a reverse direction, and visually moving the selected control segment toward the virtual control, in the reverse direction while cycling though a plurality of program conditions related to the technical function of the GUI in a reverse order. The method may further comprise receiving an indication that the contact released from the display screen at a stopping location, and selecting a selected one or the plurality of program conditions corresponding to the stopping location.

The method may further comprise receiving, before providing the virtual control, an indication of multiple simultaneous contacts with the display screen at a starting location, wherein the virtual control is provided for display at the starting location after a predetermined period after receiving the indication of multiple simultaneous contact points. In this regard, a size of the virtual control may correspond to a distance between an opposing two of the multiple simultaneous contacts.

In a further aspect, a system may include a touch-sensitive display screen, one or more processors, and a memory. The memory may include server instructions thereon that, when executed, cause the one or more processors to provide a virtual control for display on the display screen, the virtual control visually displayed as multiple control segments, the virtual control being displayed layered over an active graphical user interface (GUI) displayed on the display screen, receive an indication of a contact with the display screen at a location corresponding to a selected control segment, together with a subsequent movement of the contact over the display screen, visually detach and move the selected control segment away from the virtual control, according to the direction and the distance of the movement, while cycling though a plurality of program conditions related to the GUI, receive an indication that the contact released from the display screen at a stopping location, and select a selected one or the plurality of program conditions corresponding to the stopping location.

These and other aspects may provide one or more of the following advantages. The subject technology provides an easy to use control interface for controlling widely used functions of a graphic user interface (for example, a web browser). By providing the virtual control of the subject technology on a touch-sensitive display screen, the user may more easily manipulate information provided by the graphic user interface. Accordingly, the user is saved cognitive resources measured in the effort and time that would otherwise be required to manipulate controls integrated with the graphic user interface that may not be easily accessible (for example, on small screens), or that are not tailored to the user's liking. Accordingly, the user has more time to perform other tasks or activities.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1A:
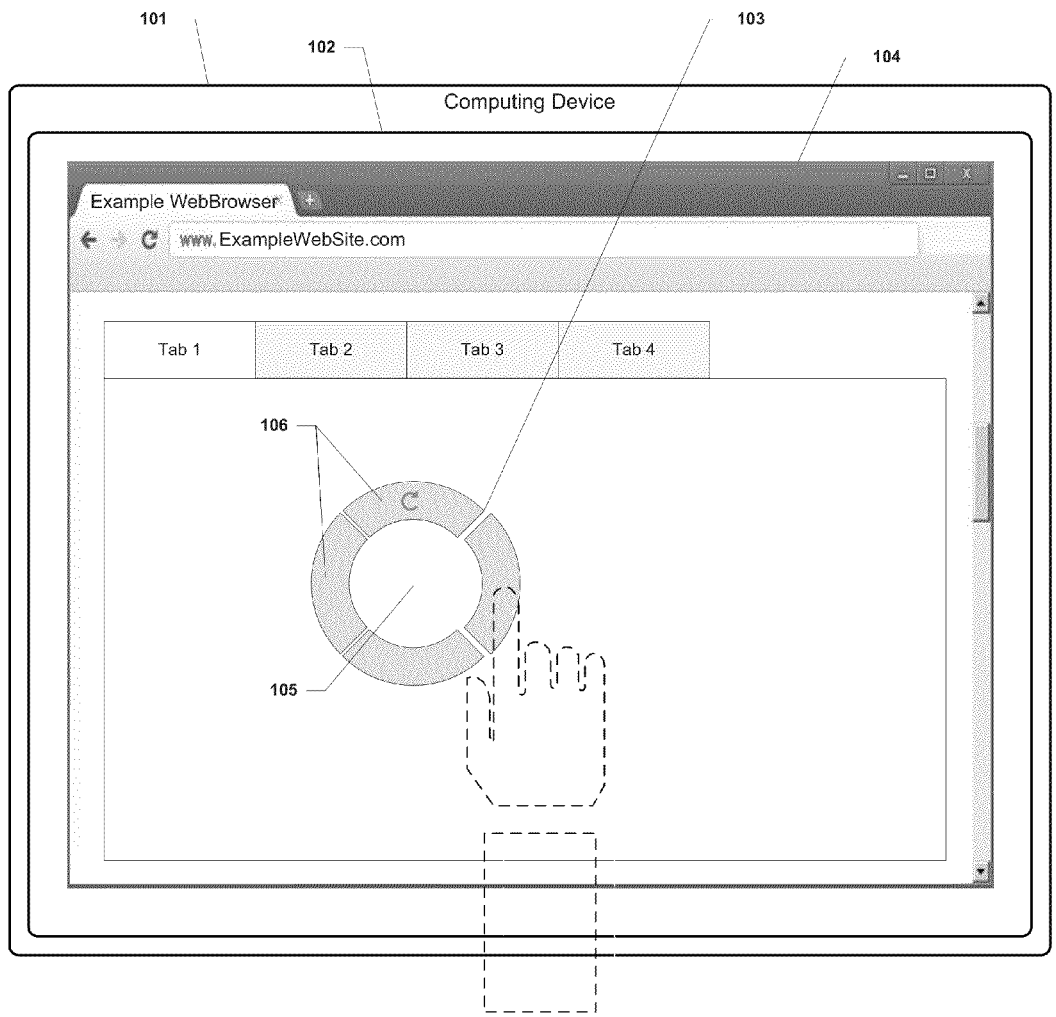
FIG. 1A is a diagram of an example computing device, including a virtual control displayed on a display screen for manipulation of a web browser.

FIG. 1A is a diagram of an example computing device, including a virtual control displayed on a display screen for manipulation of a web browser according to one aspect of the subject technology. A computing device 101 (for example, tablet computer, notebook or personal computer, PDA, a smartphone, GPS navigation device, or television or other display device with one or more computing devices embedded therein or attached thereto) is configured with program code for generating and displaying, on a touch-sensitive display screen 102, a stand-alone virtual control 103. Virtual control 103 may be graphically displayed as layered over at least a portion of a graphic user interface (GUI) 104 also displayed on display screen 102. In the depicted example, GUI 104 is a web browser, including one or more webpage displayed on the web browser, and virtual control 103 floats above the web browser, at a starting position 105.

Virtual control 103 may be displayed on display screen 102 to enable a user to control various features of GUI 104 by touching display screen 102 at one or more locations corresponding to portions of virtual control 103. Virtual control 103 may be initially displayed in response to receiving multiple simultaneous contact points at the display screen. The program code responsible for displaying virtual control 103 configures computing device 101 to detect the multiple simultaneous contact points on the surface of display screen 102, and, when detected, displays virtual control 103 at a location corresponding to the multiple simultaneous contact points, for example, at or about starting position 105. In some examples, a display of virtual control 103 may be triggered in response to two fingers coming into contact with the display screen. On an initial contact, computing device 101 may delay for a predetermined period of time before displaying virtual control 103, to verify that the user intended to activate virtual control 103. For example, on an initial touch, computing device 101 may delay x seconds (for example, 500 microseconds, 1 second, or the like) before displaying virtual control 103. Virtual control 103 may be displayed in a predefined size, or a size based on the distance between the contacts with the display screen. In one aspect, the size of virtual control 103 (for example, a diameter, radius, length, or the like) corresponds to a distance between an opposing two of the multiple simultaneous contact points.

Virtual control 103 may include a plurality of control segments 106. Each control segment 106 provides a mechanism for user interaction with GUI 103, via the display screen. In this regard, a control segment 106 may be activated by a contact or movement made at a location of display screen 102 corresponding to the control segment. When activated, the control segment operates to manipulate certain technical features or functions of an underlying active GUI 104. Control segments 106 may operate together to control a single feature of GUI 104, or may each control one or more unique features of GUI 104. One or more control segments may operate to select one of a set of program options or conditions for a feature of GUI 104. For example, three control segments 106 of virtual control 102 may adjust volume, treble and bass, respectively, for an audio or video streaming application.

Virtual control 103 may be displayed as a shape having two or more equivalent control segments 106 about a common center point (for example, starting position 105). In the depicted example, virtual control 103 comprises a pattern of four arc-shaped control segments 106 that form a circle. Without limitation, other implementations of virtual control 103 may be displayed in the form of other shapes (for example, a square or rectangle comprised of square-shaped control segments).

Figure 1B:
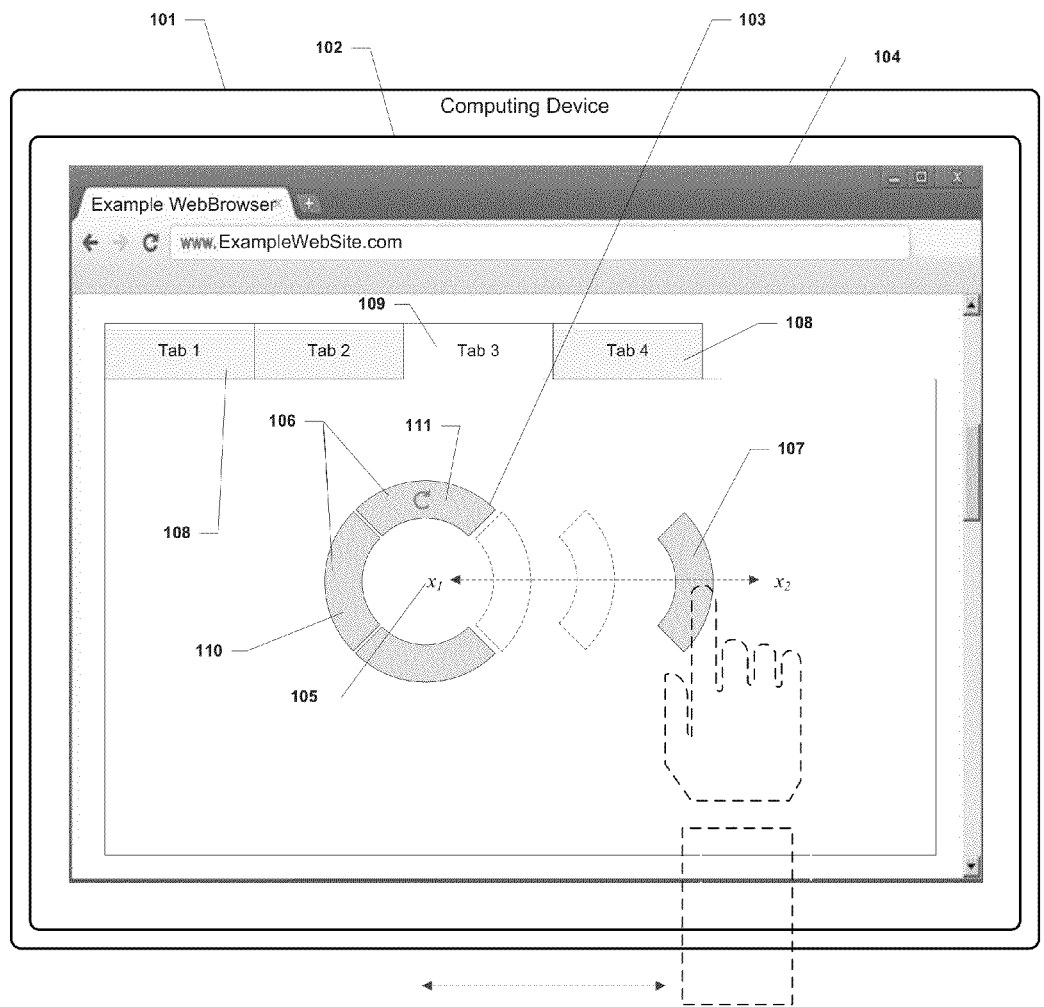
FIG. 1B depicts a user-manipulation of the virtual control to cycle through multiple tabs of the web browser.

FIG. 1B depicts a user-manipulation of the virtual control to cycle through multiple tabs of the web browser according to one aspect of the subject technology. One or more control segments 107 may be virtually detachable from virtual control 103 (and from other segments 106 of the control) to manipulate a feature of the underlying active GUI 104. A virtually-detachable control segment 107 becomes detached in response to contact and/or movement at a surface location of display screen 102 that corresponds to the control segment. For example, in response to touching the surface location corresponding to control segment 107, computing device 101 may visually display on display screen 102 the control segment as detached from remaining portions of virtual object 103 (see, for example, FIG. 1A). In some aspects, control segment 106 may be detached by a user dragging it away from virtual object 103.

Control segment 107 operates on the underlying active GUI through movement of the control segment. As control segment 107 is moved in a direction away from its starting position (for example, in a direction from $x_1$ to $x_2$), a command is sent to GUI 104 to cycle through one or more predefined program options or conditions related to the operation of the GUI. For example, program options or conditions may include applications to launch, photos or wallpapers to choose (which may be automatically displayed in the background in real-time), open tabs in a web browser, volume levels, and the like. In the depicted example, control segment 107 operates as a floating slider control, that may be moved from left to right like a one-dimensional band. Moving (for example, sliding) control segment 107 in a direction away from the starting position causes the underlying web browser to cycle through browser tabs 108.

Cycling of tabs 108 may be linear such that a selected tab 109 is activated for every n number of pixels the control segment is moved. In this respect, immediate results are seen when control segment 107 is moved, and continue to be seen as the control segment is moved farther from its starting position. Moving the control segment back towards the starting position (for example, in a direction from $x_2$ to $x_1$) may have an opposite effect. For example, program conditions may be cycled in reverse order. When movement of the control is stopped and contact at the display screen released (for example, by the user lifting his or her finger), the currently cycled program condition or option (for example, a webpage corresponding to currently opened tab 109) becomes the "active" condition or option.

In some implementations, as a right-most virtually-detachable control segment 107 is moved to the right, browser tabs 108 may be cycled in order (for example, to the right), within the web browser. As the right-most control segment 107 is moved back towards its starting position, browser tabs 108 may be cycled in reverse order. A left-most virtually-detachable control 110 may function in a similar manner, for example, provide cycling of respective conditions or options in response to movement of control 110 in a direction opposite to control 107. The order of cycling may be mirrored from that associated with control segment 107 or may be reversed from that associated with control 107. In some implementations, the user can cycle through options or conditions, forward and backward, by dragging a control segment to the left or right, and when the control segment crosses the center of virtual control 103, an opposing segment detaches from virtual control 103 and continues the movement and operative functions in the other direction.

Other (for example, top and bottom) control segments 106 may be associated with different features of a GUI 104. For example, contact with the display screen 102 at one or both of opposing control segments 106 on the left and right sides of virtual control 103 in a manner such as to simulate depressing virtual buttons may operate to cycle the program options or conditions in the manner previously described. For example, a user may press an area of the display screen 102 corresponding to a control segment 106, and as long as the control segment remains depressed, the options or conditions are cycled. Accordingly, in some implementations, a user may use control segments 106 as buttons to cycle the depicted web browser between active tabs. In some implementations, top and bottom segments may scroll an open webpage (for example, for an active tab 109) up or down according to contact at the respective segments, or movement of the control segments. In some aspects, a control segment 106 may control multiple features of GUI 104, or each control segment 106 may control a different feature. The top-most control 111 in the depicted embodiment is configured such that, on a momentary contact with control segment 111 (for example, that does not move the control segment), the web page (for example, for an active tab 109) in the web browser is refreshed.

In some implementations, control segment 107 may correspond to a menu associated or integrated with GUI 104. The menu opens upon activation of control segment 107 (for example, when it is detached), and the options of the menu are sequentially cycled and highlighted in response to movement of control segment 107 in the previously described manner. When the movement of the control is stopped and contact at the display screen released the currently highlighted option is selected and the menu returns to its default state (for example, disappears).

According to the previously described implementations, a user may also touch display screen 102 and begin dragging control segment 107 before virtual control is displayed. Accordingly, virtual control 103 may be displayed after the predetermined delay time has elapsed, with control segment 107 displayed at a current location corresponding to the current location of the user contact.

Figure 2:
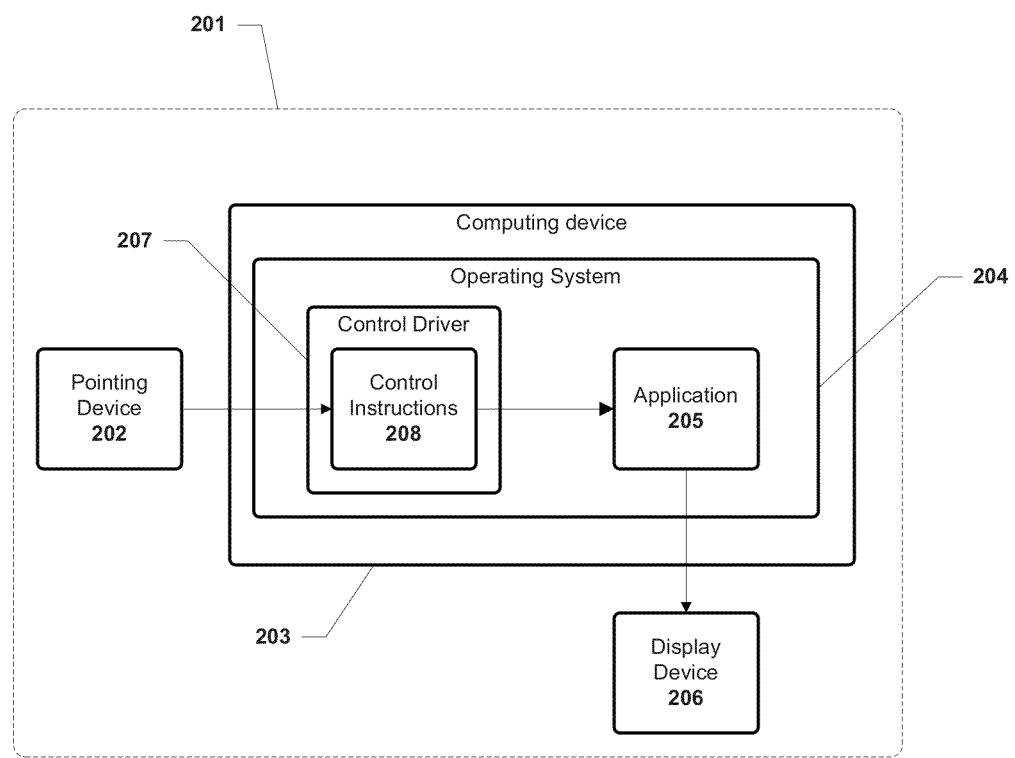
FIG. 2 depicts example components for display and operation of the virtual control.

FIG. 2 is a diagram of an example system for displaying a virtual control according to one aspect of the subject technology. A system 201 may include a pointing device 202 (for example, a mouse, touch-sensitive pad or display, serial laser pointer, or the like) operably connected to a computing device 203 (for example, a personal or notebook computer, tablet computer, smart phone, PDA, a television or other display device with one or more computing devices embedded therein or attached thereto, or the like). Computing device 203 may include an operating system 204 for executing an application 205 on computing device 203. Application 105 may be responsible for generating GUI 104 and for, in combination with operating system 104, display of GUI 104 on a display device 206 associated with computing device 203.

In some aspects, pointing device 202, computing device 203, and display device 206 may be integrated as a single device including, for example, a touch sensitive pad or display (for example, as shown in FIGS. 1A and 1B). Pointing device 202 may interface with computing device 203 and operating system 204 to move a position indicator (for example, a cursor, on-screen pointer, or the like) on display device 205, to interact with application 205. In this regard, computing device 203 may be configured with a device driver 207 for translating user-initiated movement of pointing device 202 into commands usable by operating system 204 or application 205. According to the subject technology, driver 207 may be configured with control instructions 208 for display of a virtual control 103 that visually interacts with pointing device 202, and integration of the virtual control with an application programming interface (API) of application 205 to control one or more functions of application 205.

In some aspects, control instructions 208 may receive position and control information from pointing device 202 and transmit the position and/or control information to application 205 as control commands that are recognizable by application 205. Device driver 207 intercepts position and control information from pointing device 202 as it relates to interactions with virtual control 103, and then transmits specific interface control commands to application 205 according to the interaction with virtual control 103. In one example, operating system 204 may include one or more thread monitors that look for predefined control commands (for example, mouse or keyboard commands) that are generated as a result of interaction with pointing device 202. Application 205 is associated with one or more command or message queues.

When an interface control command is detected, a thread monitor associated with operating system 204 diverts it to the appropriate queue for application 205, where it is used by application 205 (for example, to control GUI 104).

Figure 3:
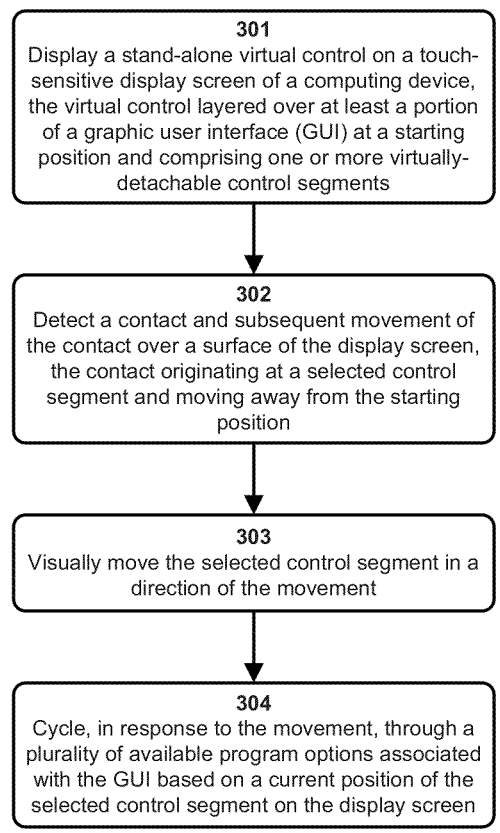
FIG. 3 is a flowchart illustrating an example process for providing a virtual control for cycling through multiple options available in a graphic user interface.

FIG. 3 is a flowchart illustrating an example process for providing a virtual control for cycling through multiple options available in a graphic user interface according to one aspect of the subject technology. According to some aspects, the blocks of FIG. 3 may be executed by a computing device (for example, tablet computer, a desktop or notebook computer, PDA, smartphone, a television or other display device with one or more computing devices embedded therein or attached thereto, or the like). In this regard, the blocks of FIG. 3 may be performed within the context of operating a web browser provided by the computing device.

In block 301, a stand-alone virtual control is displayed on a touch-sensitive display screen of a computing device, the virtual control layered over at least a portion of a graphic user interface (GUI) at a starting position and comprising one or more virtually-detachable control segments. For example, a virtual control 103 may be displayed in response to multiple simultaneous contacts with display device 206. Control instructions 208 may detect contact with display device 206, and, on an indication of multiple simultaneous contacts at a starting location of display device 206, virtual control 103 is provided by control instructions 208 for display at starting location 105. In some implementations, virtual control 103 is displayed after a predetermined period after receiving the indication of multiple simultaneous contact points. Thus, inadvertent activation of virtual control 103 may be prevented.

In block 302, a contact and subsequent movement of the contact is detected over a surface of the display screen, the contact originating at a selected control segment and moving away from the starting position. In some aspects, control instructions 208 (for example, corresponding to the selected control segment) are activated in response to the contact. When activated, control instructions 208 operate to control a technical function of GUI 104 based on a movement of the contact over display device 206.

In block 303, the selected control segment is visually moved, in response to the movement of the contact, in a direction of the movement. Accordingly, when control instructions 208 receive an indication that the contact is moving in a first direction, control instructions 208 cause the computing device to visually move the selected control segment away from the virtual control, in the first direction, according to the movement. When an indication is received that the contact is moving in a reverse direction, the selected control segment may be visually moved according to the movement in the reverse direction.

In block 304, in response to the movement of the contact, the subject technology automatically cycles through a plurality of available program options associated with the GUI based on a current position of the selected control segment on the display screen. When an indication is received that the contact has released from the display screen at a stopping location, the program option corresponding to the stopping location is selected. In some implementations, an available program option includes one of multiple active tabs of a web browser. Accordingly movement of the contact may generate control commands that, when sent to the web browser, cycle through a plurality of browser tabs displayed in the web browser. In various aspects, a program option may also be cycled for each movement of the selected control segment a distance of a predetermined number of pixels (for example, every 25 or 50 pixels). The program options may be cycled in a first order or reverse order, depending on the direction of the corresponding movement at pointing device 202.

Figure 4:
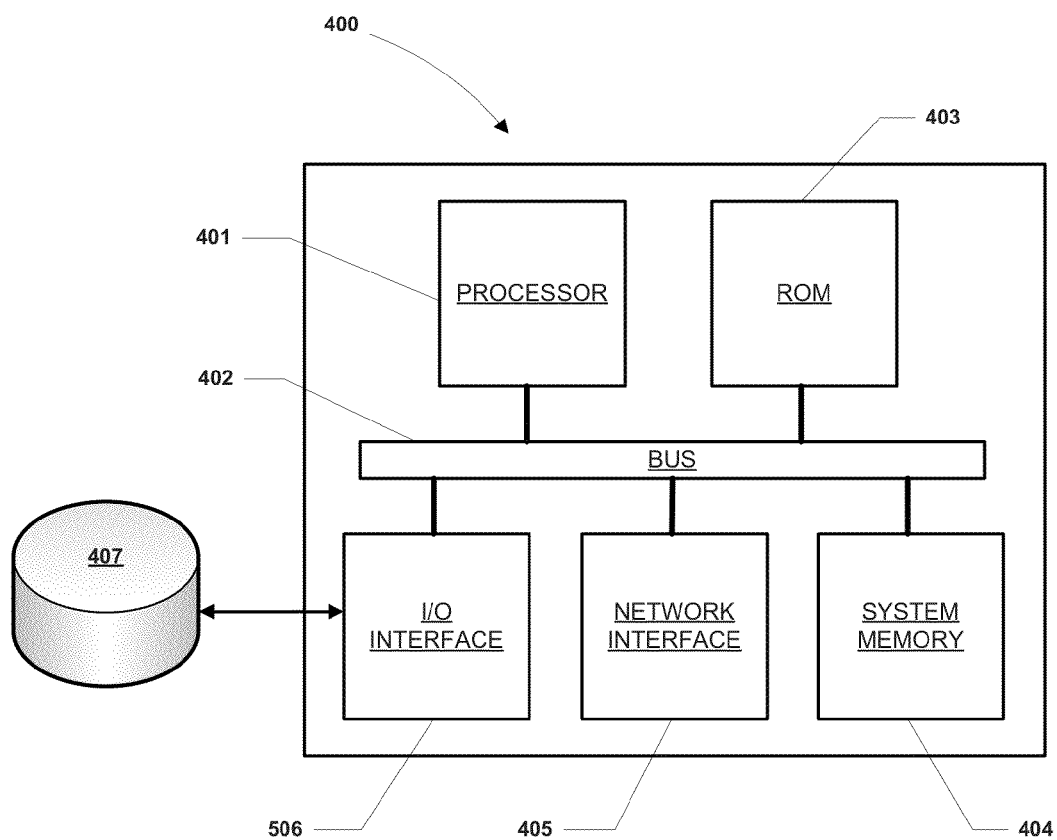
FIG. 4 is a diagram illustrating an example server system for providing a virtual control, including a processor and other internal components.

FIG. 4 is a diagram illustrating an example server system for providing a virtual control, including a processor and other internal components, according to one aspect of the subject technology. In some aspects, a computerized device 400 (for example, computing device 101 or 203, or the like) includes several internal components such as a processor 401, a system bus 402, read-only memory 403, system memory 404, network interface 405, I/O interface 406, and the like. In one aspect, processor 401 may also be communication with a storage medium 407 (for example, a hard drive, database, or data cloud) via I/O interface 406. In some aspects, all of these elements of device 400 may be integrated into a single device. In other aspects, these elements may be configured as separate components.

Processor 401 may be configured to execute code or instructions to perform the operations and functionality described herein, manage request flow and address mappings, and to perform calculations and generate commands. Processor 401 is configured to monitor and control the operation of the components in server 400. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 401. Likewise, one or more sequences of instructions may be software stored and read from system memory 405, ROM 403, or received from a storage medium 407 (for example, via I/O interface 406). ROM 403, system memory 405, and storage medium 407 represent examples of machine or computer readable media on which instructions/code may be executable by processor 401. Machine or computer readable media may generally refer to any medium or media used to provide instructions to processor 401, including both volatile media, such as dynamic memory used for system memory 404 or for buffers within processor 401, and non-volatile media, such as electronic media, optical media, and magnetic media.

In some aspects, processor 401 is configured to communicate with one or more external devices (for example, via I/O interface 406). Processor 401 is further configured to read data stored in system memory 404 and/or storage medium 407 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 404 represents volatile memory used to temporarily store data and information used to manage device 400. According to one aspect of the subject technology, system memory 404 is random access memory (RAM) such as double data rate (DDR) RAM. Other types of RAM also may be used to implement system memory 404. Memory 404 may be implemented using a single RAM module or multiple RAM modules. While system memory 404 is depicted as being part of device 400, those skilled in the art will recognize that system memory 404 may be separate from device 400 without departing from the scope of the subject technology. Alternatively, system memory 404 may be a non-volatile memory such as a magnetic disk, flash memory, peripheral SSD, and the like.

I/O interface 406 may be configured to be coupled to one or more external devices, to receive data from the one or more external devices and to send data to the one or more external devices. I/O interface 406 may include both electrical and physical connections for operably coupling I/O interface 406 to processor 401, for example, via the bus 402. I/O interface 406 is configured to communicate data, addresses, and control signals between the internal components attached to bus 402 (for example, processor 401) and one or more external devices (for example, a hard drive). I/O interface 406 may be configured to implement a standard interface, such as Serial-Attached SCSI (SAS), Fiber Channel interface, PCI Express (PCIe), SATA, USB, and the like. I/O interface 406 may be configured to implement only one interface. Alternatively, I/O interface 406 may be configured to implement multiple interfaces, which are individually selectable using a configuration parameter selected by a user or programmed at the time of assembly. I/O interface 406 may include one or more buffers for buffering transmissions between one or more external devices and bus 402 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computer-implemented method, comprising:
   displaying a stand-alone virtual control on a touch-sensitive display screen of a computing device, the virtual control layered over at least a portion of a graphic user interface (GUI) at a starting position and comprising one or more virtually-detachable control segments, each control segment virtually detachable in a direction away from the virtual control;
   detecting a contact and subsequent movement of the contact over a surface of the display screen, the contact originating at a selected control segment and moving away from the starting position and the virtual control;
   visually moving, in response to the movement of the selected control segment away from the starting position, the selected control segment in a direction of the movement; and
   cycling, in response to the movement of the contact, through a plurality of available program options associated with the GUI based on a current position of the selected control segment on the display screen.

2. The computer-implemented method of claim 1, further comprising:
receiving an indication that the movement has stopped at a stopping position; and
selecting one of the plurality of program options corresponding to the stopping position.

3. The computer-implemented method of claim 1, wherein the virtual control is displayed as a circle, the virtually-detachable control segments being positioned about a common center point.

4. The computer-implemented method of claim 1, wherein the virtual control comprises multiple virtually-detachable control segments, each virtually-detachable control segment operating to, when moved, cycle a unique set of program options.

5. The computer-implemented method of claim 1, the method further comprising:
in response to detecting the contact, visually detaching the selected control segment from remaining portions of the virtual control.

6. The computer-implemented method of claim 1, wherein the virtual control comprises multiple interactive segments, each interactive segment, when activated by a contact or movement at a location of the display screen corresponding to the interactive segment, operating to control a different technical function of the GUI.

7. The computer-implemented method of claim 1, wherein the GUI is a web browser, and wherein cycling through the plurality of program options comprises:
cycling through a plurality of browser tabs displayed in the web browser.

8. The computer-implemented method of claim 1, wherein a new tab is opened for each predetermined number of pixels the selected control segment is moved.

9. The computer-implemented method of claim 1, further comprising:
detecting a movement of the contact toward the starting position;
visually moving the selected control segment toward the starting position; and
cycling through the plurality of program options, in a reverse order.

10. The computer-implemented method of claim 1, the method further comprising:
detecting, before displaying the virtual control, multiple simultaneous contact points at the surface of the display screen, wherein the virtual control is displayed on the display screen at a location corresponding to the multiple simultaneous contact points.

11. The computer-implemented method of claim 10, wherein a size of the virtual control corresponds to a distance between an opposing two of the multiple simultaneous contact points.

12. The computer-implemented method of claim 10, wherein the virtual control is displayed when the multiple simultaneous contact points are detected and maintained at the surface of the display screen for a predetermined period of time.

13. A non-transitory machine-readable medium having machine-executable instructions stored thereon, which when executed by a machine or computer cause the machine or computer to perform a method, comprising:
providing a virtual control for display on a touch-sensitive display screen of a computing device, the virtual control visually displayed as multiple control segments, the virtual control being displayed layered over an active graphical user interface (GUI) displayed on the display screen, each control segment being virtually detachable from the virtual control in a direction away from the virtual control;
receiving an indication of contact with the display screen at a location corresponding to a selected control segment; and
activating, in response to the contact, control instructions corresponding to the selected control segment,
wherein the control instructions, when activated, operate to control a technical function of the GUI and cycle through a plurality of program conditions related to the technical function of the GUI based on a movement of the contact and selected control segment over the display screen.

14. The non-transitory machine-readable medium of claim 13, further comprising:
receiving an indication that the contact is moving in a first direction; and
visually moving the selected control segment away from the virtual control in the first direction while cycling though the plurality of program conditions related to the technical function of the GUI in a first order.

15. The non-transitory machine-readable medium of claim 14, wherein a program condition is cycled for each movement of the selected control segment a predetermined number of pixels.

16. The non-transitory machine-readable medium of claim 14, further comprising:
receiving an indication that the contact is moving in a reverse direction; and
visually moving the selected control segment toward the virtual control in the reverse direction while cycling though the plurality of program conditions related to the technical function of the GUI in a reverse order.

17. The non-transitory machine-readable medium of claim 14, further comprising:
receiving an indication that the contact released from the display screen at a stopping location;
selecting one of the plurality of program conditions corresponding to the stopping location.

18. The non-transitory machine-readable medium of claim 13, further comprising:
receiving, before providing the virtual control, an indication of multiple simultaneous contacts with the display screen at a starting location, wherein the virtual control is provided for display at the starting location after a predetermined period after receiving the indication of multiple simultaneous contact points.

19. The non-transitory machine-readable medium of claim 18, wherein a size of the virtual control corresponds to a distance between an opposing two of the multiple simultaneous contacts.

20. A system, comprising:
a touch-sensitive display screen;
a processor; and
a memory including instructions that, when executed by the processor, causes the processor to:
provide a virtual control for display on the display screen, the virtual control visually displayed as multiple control segments, the virtual control being displayed layered over an active graphical user interface (GUI) displayed on the display screen, each control segment being virtually detachable from the virtual control in a direction away from the virtual control;

receive an indication of a contact with the display screen at a location corresponding to a selected control segment, together with a subsequent movement of the contact over the display screen;

visually detach and move the selected control segment away from the virtual control, according to the direction and the distance of the movement, while cycling though a plurality of program conditions related to the GUI;

receive an indication that the contact released from the display screen at a stopping location; and select one of the plurality of program conditions corresponding to the stopping location.

\* \* \* \* \*